(12) United States Patent
Hundemer (10) Patent No.: US 9,264,752 B1
(45) Date of Patent: Feb. 16, 2016

(54) NEWS PRODUCTION SYSTEM WITH DYNAMIC MEDIA SERVER ALLOCATION

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

(21) Appl. No.: 14/556,636

(22) Filed: Dec. 1, 2014

Related U.S. Application Data

(60) Provisional application No. 61/986,690, filed on Apr. 30, 2014.

(51) Int. Cl.
*H04N 7/16* (2011.01)
*H04N 21/262* (2011.01)
*H04L 29/06* (2006.01)
*H04N 21/2665* (2011.01)
*H04N 21/234* (2011.01)
*H04N 21/81* (2011.01)
*H04N 21/61* (2011.01)
*G06F 9/50* (2006.01)
*H04N 21/231* (2011.01)

(52) U.S. Cl.
CPC .......... *H04N 21/26258* (2013.01); *G06F 9/505* (2013.01); *G06F 9/5044* (2013.01); *G06F 9/5055* (2013.01); *H04L 65/60* (2013.01); *H04N 21/23103* (2013.01); *H04N 21/23424* (2013.01); *H04N 21/2665* (2013.01); *H04N 21/26241* (2013.01); *H04N 21/26283* (2013.01); *H04N 21/6106* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 2005/0021822 A1* | 1/2005 | Cherkasova | H04L 29/06027 709/232 |
| 2008/0162713 A1* | 7/2008 | Bowra | H04N 21/4344 709/231 |
| 2009/0183218 A1* | 7/2009 | Li | H04N 21/23103 725/114 |

\* cited by examiner

*Primary Examiner* — Nicholas Corbo
(74) *Attorney, Agent, or Firm* — McDonnell Boehnen Hulbert & Berghoff LLP (57) ABSTRACT

An example method involves: (i) accessing data representing a news program schedule that specifies a sequence of events to be carried out using a news production system, wherein the schedule is divided into contiguous portions; (ii) for each portion: determining that m media servers are sufficient to execute any events of that portion and associated with a first device, allocating m media servers to the first device, thereby leaving one or more unallocated media servers, and allocating n media servers, from the unallocated media servers, to a second device; and (iii) for each of the contiguous portions, utilizing at least a portion of the allocated m media servers to carry out the events specified in that portion and associated with the first device and utilizing at least a portion of the allocated n media servers to carry out the events specified in that portion and associated with the second device.

20 Claims, 4 Drawing Sheets

NEWS PRODUCTION SYSTEM WITH DYNAMIC MEDIA SERVER ALLOCATION

CROSS-REFERENCE TO RELATED DISCLOSURE

This disclosure claims priority to U.S. Provisional Pat. App. No. 61/986,690 filed Apr. 30, 2014, which is hereby incorporated by reference herein in its entirety.

USAGE AND TERMINOLOGY

Throughout this application, unless otherwise specified (and/or unless the particular context clearly dictates otherwise), each usage of "a" or "an" means at least one, and each usage of "the" means the at least one.

TECHNICAL FIELD

The disclosure generally relates to news production systems.

BACKGROUND

Unless otherwise indicated herein, the materials described in this section are not prior art to the claims in this disclosure and are not admitted to be prior art by inclusion in this section.

A news production system (NPS) may facilitate the production of a news program for television broadcast. In this context, the NPS may produce a news program in accordance with a news program schedule (sometimes called a "rundown"), which specifies an order of events related to the production of the news program. For instance, a news program schedule may indicate that various media content items are to be loaded into and played out of one or more media servers, in a particular order, so that the media content items may be made part of the news program.

SUMMARY

In one aspect, an example method for use with an NPS is disclosed. The NPS includes multiple media servers, a router, a first destination device, and a second destination device. An output of each of the media servers is connected to a respective input of the router, a first output of the router is connected to an input of the first destination device, and a second output of the router is connected to an input of the second destination device. The method involves accessing data representing a news program schedule that specifies a sequence of events to be carried out using the NPS, wherein the news program schedule is divided into contiguous portions. The method further involves, for each of the contiguous portions, (i) determining that m media servers are sufficient to execute any events that are of that portion and that are associated with the first destination device, (ii) allocating m media servers to the first destination device, thereby leaving one or more unallocated media servers, and (iii) allocating n media servers, from among the one or more unallocated media servers, to the second destination device. The method further involves, for each of the contiguous portions, (i) utilizing at least a portion of the allocated m media servers to carry out the events that are specified in that portion and that are associated with the first destination device, and (ii) utilizing at least a portion of the allocated n media servers to carry out the events that are specified in that portion and that are associated with the second destination device.

In another aspect a non-transitory computer-readable medium is disclosed. The medium has stored thereon program instructions that when executed by a processor cause performance of a set of functions in connection with an NPS. The NPS includes multiple media servers, a router, a first destination device, and a second destination device. An output of each of the media servers is connected to a respective input of the router, a first output of the router is connected to an input of the first destination device, and a second output of the router is connected to an input of the second destination device. The set of functions includes accessing data representing a news program schedule that specifies a sequence of events to be carried out using the NPS, wherein the news program schedule is divided into contiguous portions. The set of functions further includes, for each of the contiguous portions, (i) determining that m media servers are sufficient to execute any events that are of that portion and that are associated with the first destination device, (ii) allocating m media servers to the first destination device, thereby leaving one or more unallocated media servers, and (iii) allocating n media servers, from among the one or more unallocated media servers, to the second destination device. The set of functions further includes, for each of the contiguous portions, (i) utilizing at least a portion of the allocated m media servers to carry out the events that are specified in that portion and that are associated with the first destination device, and (ii) utilizing at least a portion of the allocated n media servers to carry out the events that are specified in that portion and that are associated with the second destination device.

In another aspect, an NPS is disclosed. The NPS includes multiple media servers, a router, a first destination device, a second destination device, and a control system. An output of each of the media servers is connected to a respective input of the router, a first output of the router is connected to an input of the first destination device, and a second output of the router is connected to an input of the second destination device. The control system is configured for accessing data representing a news program schedule that specifies a sequence of events to be carried out using the NPS, wherein the news program schedule is divided into contiguous portions; and for each of the contiguous portions, (i) determining that m media servers are sufficient to execute any events that are of that portion and that are associated with the first destination device, (ii) allocating m media servers to the first destination device, thereby leaving one or more unallocated media servers, and (iii) allocating n media servers, from among the one or more unallocated media servers, to the second destination device; and for each of the contiguous portions, (i) utilizing at least a portion of the allocated m media servers to carry out the events that are specified in that portion and that are associated with the first destination device, and (ii) utilizing at least a portion of the allocated n media servers to carry out the events that are specified in that portion and that are associated with the second destination device.

These as well as other aspects, advantages, and alternatives, will become apparent to those of ordinary skill in the art by reading the following detailed description, with reference where appropriate to the accompanying drawings.

DETAILED DESCRIPTION OF THE DRAWINGS

I. Overview

An NPS may utilize media servers to facilitate the production of a news program in a variety of ways. In one example arrangement, an NPS includes a first media server and a production switcher, and an output of the first media server is connected to a first input of the production switcher. The NPS also includes a camera, a second media server, a composite display driver, and a composite display. An output of the camera is connected to a second input of the production switcher, and an output of the second media server is connected to an input of the composite display driver. Outputs of the composite display driver are connected to inputs of the composite display, which is positioned within a field of view of the camera.

With this arrangement, in a first example the first media server may playout a video content item in the form of a video stream, and the production switcher may execute a digital video effect (DVE) that causes the production switcher to use the video stream, and perhaps other media content items (e.g., provided by other media servers), to generate and output the news program in the form of another video stream. In this example, since the first media server transmits the video stream to the production switcher, the production switcher may be characterized as a destination device of the first media server.

Further, with this arrangement, in a second example the second media server may playout a video content item in the form of a video stream, and the composite display driver may execute a DVE that causes the driver to use the video stream, and perhaps other media content items (e.g., provided by other media servers) to generate and output multiple video streams for display on the composite display. Further, the production switcher may execute a DVE that causes the production switcher to use a video stream captured by the camera (and that therefore includes the video content item displayed on the composite display), and perhaps other media content items (e.g., provided by other media servers), to generate and output the news program in the form of another video stream. In this example, since the second media server transmits the video stream to the composite display driver, the driver may be characterized as a destination device of the second media server.

While each of the two examples provided above involves a media server providing a video stream to a respective destination device, in practice with more complex events specified in the schedule, the NPS may utilize multiple media servers to perform such events. Given this, an NPS may include a first group of media servers that are connected to, and therefore allocated to, the production switcher such that they may be utilized for events where the production switcher is specified as a destination device. Similarly, the NPS may include a second group of media servers that are connected to, and therefore allocated to, the composite display driver such that they may be utilized for events where the driver is specified as a destination device. As such, the second group of media servers gets allocated to the composite display driver.

Notably however, this approach may result in an inefficient use of resources as each group of media servers is statically allocated to a particular destination device. The disclosed NPS helps address this issue by analyzing a news program schedule and dynamically allocating media servers to respective destination devices as needed during the production of the news program such that the NPS can carry out the events specified in the schedule, but with less media servers. Also, by using a router to connect the media servers to the destination devices, the NPS can utilize particular media servers (from among a group of dynamically allocated media servers) by, among other things, controlling a mapping function of the router. This process of allocating and utilizing media servers may then be repeated various times throughout the news program such that the media servers can be re-allocated and re-utilized as appropriate based on changing needs in the news program schedule.

An example NPS that provides such functionality includes multiple media servers, a router, a composite display driver (or another destination device), and a production switcher (or another destination device). An output of each of the media servers is connected to a respective input of the router, a first output of the router is connected to an input of the display driver, and a second output of the router is connected to an input of the production switcher.

The NPS is also configured for performing a set of functions, which includes accessing data representing a news program schedule that specifies a sequence of events to be carried out using the NPS. The news program schedule may be divided into contiguous portions. For instance, the news program schedule may be divided by commercial-break markers into contiguous show-block portions.

The set of functions further includes, for each of the contiguous portions, (i) determining that m media servers are sufficient to execute any events that are of that portion and that are associated with the composite display driver, (ii) allocating m media servers to the composite display driver, thereby leaving one or more unallocated media servers, and (iii) allocating n media servers, from among the one or more unallocated media servers, to the production switcher.

The set of functions further includes, for each of the contiguous portions, (i) utilizing at least a portion of the allocated m media servers to carry out the events that are specified in that portion and that are associated with the composite display driver, and (ii) utilizing at least a portion of the allocated n media servers to carry out the events that are specified in that portion and that are associated with the production switcher.

By repeating the allocating and utilizing functions for each portion of the news program schedule, the NPS can dynamically allocate and utilize media servers as needed.

II. Example NPS

Figure 1:
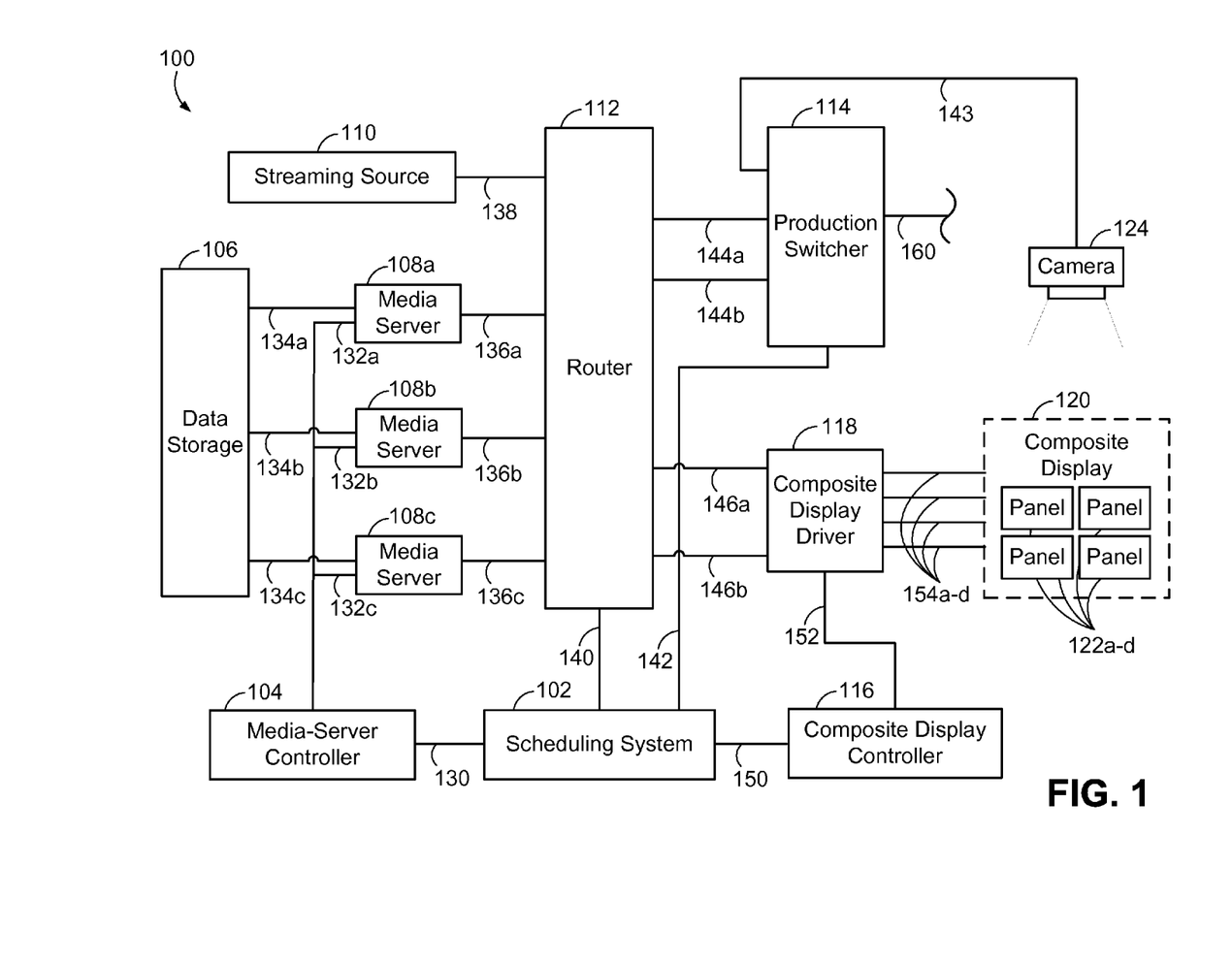
FIG. 1 is a simplified diagram of an example NPS.

FIG. 1 is a simplified block diagram of an example NPS 100. The NPS 100 may be configured to perform a variety of functions related to producing a news program. The NPS 100 may output the news program in the form of a video stream, which in turn may be transmitted to a television-broadcasting system for broadcast, or to another type of system for distribution. It is understood that the video stream output from the NPS 100 may be subjected to additional processing before being broadcast. For example, the video stream may be modified as a result of a DVE being executed.

The NPS 100 may include one or more devices, including for example a scheduling system 102, a media-server controller 104, a data storage 106, one or more media servers 108a-c, a streaming source 110, a router 112, a production switcher 114, a composite display controller 116, a composite display driver 118, a composite display 120, and a camera 124. The devices in the NPS 100 may be configured to communicate between one or more others of the devices so as to cause or allow the NPS 100 to carry out the functions described herein. Note that the NPS 100 need not include all of these devices and it may include additional devices.

The devices in the NPS 100 described herein may communicate with each other and/or with external devices via one or more communication paths. Generally, the communication paths between devices may be provided via wired and/or wireless communication in accordance with one or more communication protocols as necessary to achieve desired performance characteristics (e.g., bandwidth or latency). These devices may communicate with each other and/or with external devices according to one or more protocols. In some cases, the devices may communicate in accordance with one or more versions of the Media Object Server (MOS) protocol.

For example, as shown in FIG. 1, the scheduling system 102 and the media-server controller 104 may communicate via path 130, the media-server controller 104 and the media servers 108a-c may communicate via respective paths 132a-c, and the media-servers 108a-c and the data storage 106 may communicate via respective paths 134a-c. Further, the media servers 108a-c and the router 112 may communicate via respective paths 136a-c. The streaming source 110 and the router 112 may communicate via path 138. The router 112 may communicate with the composite display driver 118 via respective paths 146a-b, and may communicate with the production switcher 114 via respective paths 144a-b. In addition, the router 112 may communicate with the player controller 104 via path 139 to exchange command and control information. In addition, the router 112 may optionally exchange command and control information by communicating with the scheduling system 102 (via path 140) and/or the composite display controller 116 (via path 141). The production switcher 114 can also communicate with the camera 124 via path 143. The scheduling system 102 and the production switcher 114 can communicate via path 142. The composite display driver 118 and the composite display 120 (and the individual display panels 122a-d) may communicate via respective paths 154a-d. The scheduling system 102 and the composite display controller 116 may communicate via path 150. The composite display controller 116 and the composite display driver 118 may communicate via path 152. And the composite display controller 116 and the media-server controller 104 may communicate via path 156.

A. Scheduling System

The scheduling system 102 is configured to perform functions related to scheduling and managing the production of a news program. For example, the scheduling system 102 may be configured for accessing data representing a news program schedule that specifies a sequence of events to be carried out using the NPS 100 to produce the news program. The scheduling system 102 may include a user interface to allow a user to generate the news program schedule. Once generated, the scheduling system 102 may store the news program schedule in a shared database and make the news program schedule available to be accessed by other components in the NPS 100. The NPS components can then access entries in the news program schedule, select one or more entries, read data associated with those entries, and determine and perform actions based on attributes in those entries (i.e., in the received data). As a result, the various components in the NPS 100 perform various actions corresponding to each entry in the sequence indicated by the news program schedule. In some cases, the timing of each event may further be controlled, at least in part, by the scheduling system 102 (e.g., by specifying a particular number of seconds or frame times, or another measure of time between distinct events) or perhaps a user input may indicate a start time for one or more events (e.g., to facilitate timing control by a producer or other individual).

The scheduling system 102 may alternately be referred to herein as a "sequencing system" to reflect its role in setting the sequence of various events, but not necessarily the timing of those events, which may be based on an external input (e.g., a user input). Functionality of the scheduling system 102 to effect automated control of the NPS 100 (e.g., in accordance with a predetermined scripted sequence) is described further herein.

B. Video Sources

The media-server controller 104 is configured for performing functions related to controlling the media-servers 108a-c, which are configured to retrieve, decode, and play out specified video content (or other media content). Video content items accessible by the media servers 108a-c can be stored in the data storage 106 in form of video files. Upon retrieving and playing out selected video content items, the media servers 108a-c can provide the video content items in the form of video streams to the router 112. The player controller 104 can operate in accordance with information from the scheduling system 102, provided via path 130. Similarly, the media-server controller 104 can provide respective command instructions via paths 132a-c to the players 108a-c, which cause the media servers 108a-c to locate and access stored video files via signals on paths 134a-c with the data storage 106. The media servers 108a-c can then output corresponding video streams communicated via paths 136a-c to the router 112.

Each media player 108a-c may take a variety of forms. For instance, each media server 108a-c may take the form of a video server device or a software-based video server executing on a computing device. The media-server controller 104 can dynamically allocate the media servers 108a-c to provide video streams from stored video content items (e.g., in the data storage 106) to various components in the NPS 100. In practice, the player controller 104 may evaluate entries in the news program schedule provided by the scheduling system 102 via path 130, determine, based on attributes in those entries, to load and play out particular video content items, and then allocate ones of the media servers 108a-c as necessary and available to provide the video content items specified by the news program schedule. As such, at various times, and based on the news program schedule entries, the player controller 104 may allocate ones of the media servers 108a-c to provide video content items in the form of video streams both to the production switcher 114 and the composite display driver 118, or to one or the other. The player controller 104 can then instruct the router 112, via path 13, to direct such video streams played out by ones of the players 108a-c to the production switcher 114 (via paths 144a-b) and/or the composite display driver 118 (via paths 146a-b). To facilitate efficient use of the media server 108a-c, upon completion of playing out a given video content item using a given media server (e.g., due to completion of a composite display event or otherwise), the media-server controller 104 may further release the given media server to allow it to be available for usage during a subsequent allocation of the media server.

Additionally or alternatively, the router 112 can receive video content items in the form of video streams via path 138 from a streaming source 110. For example, the streaming source 110 may include live captured video from a production crew reporting in real time from a newsworthy location.

Generally, the various video sources may be configured to queue a given source of a video content item in response to a suitable instruction from the media-server controller 104 (or another NPS component), which may operate based on an entry specified in a news program schedule. For example, the media servers 108*a-c* may load and buffer a given video content item from the data storage 106 in response to an instruction from the player controller 110 and/or the streaming source 110. In addition, the video sources may be configured to provide a feedback signal that indicates the readiness of the video source to provide a requested video content item. In practice, upon one of the media servers 108*a-c* loading and buffering a given video content item, the media server may send an indication to the media-server controller 104 indicating that the media server is ready for playout.

C. Router

As noted above, the router 112 can receive input video streams from the media servers 108*a-c* and/or the streaming source 110, and provides output video streams to the production switcher 114 and/or the composite display driver 118. Control signals via path 139 from the media-server controller 104 (and/or another sub-system with access to the news program schedule, such as the scheduling system 102, via path 140, or the composite display controller 116, via path 141) instruct the router 112 as to how to direct a given input to a given output at a given instant. For example, the router 112 may have multiple input channels and multiple output channels. At a given instant, the control signals via path 140 from the scheduling system 102 can instruct the router 112 as to which input channel(s) (e.g., the inputs corresponding to paths 136*a-c*, 138) to map to one or more of the output channel(s) (e.g., the outputs corresponding to paths 144*a-b*, 146*a-b*).

The router 112 thereby allows the media-server controller 104 to effect switching between the various media servers on the one hand and the production switcher or composite display device on the other hand, at different times. And the media-server controller 104 may carry out such switching using the router 112 in accordance with an entry in the news program schedule, as provided via the scheduling system 102.

In some examples described herein, the components in the NPS 100 that function to provide input video streams to the composite display driver 118 and/or the production switcher 114 are referred to herein as a video feed network. For example, the video feed network may include, without limitation, the media-server controller 104, the data storage 106, the media-servers 108*a-c*, the streaming source 110, and/or the router 112, which function together to provide requested video content items in the form of video streams.

D. Composite Display

The composite display 120 can include multiple display panels 122*a-d* positioned adjacent one another and operated to jointly render video content provided via the composite display driver 118. That is, the individual display panels 122*a-d* can operate so as to display respective portions of a video content stream. In practice, the composite display driver 118 may sub-divide each frame of a video stream so as to render a portion of each frame on each of the display panels 122*a-d*. In operation then, the composite display 120 can appear similar to a single display panel that spans the region occupied by the panels 122*a-d* in which the separate panels 122*a-d* may or may not be evident. For example, the display panels 122*a-d* can be substantially co-planar with one another with respective active display surfaces oriented in a common direction. However, alternative configurations may also be employed.

Composite displays can offer some performance advantages over a single display panel in a news set environment. In order to render video content in a manner that is readily captured by the camera 124, the individual display panels 122*a-d* are generally driven at a relatively high brightness setting to overcome washout from overhead lights. Due to the expense of display panels with high brightness capabilities, a composite display formed from multiple smaller display panels provides greater affordability and scalability than achievable using a single large display panel. In addition, using multiple individual display panels increases the effective resolution of the assembled composite display because the number of individual pixels in the resulting composite display is generally greater, for a given total display area, than achieved by a comparably-sized single display panel. Composite displays therefore mitigate pixilation and distortions even when a variety of camera perspectives are captured, including shots that zoom in on a sub-portion of the composite display.

The composite display driver 118 is a specialized video processor module configured to perform certain functions such as those described herein. The composite display driver 118 operates in accordance with instructions sent via path 152 from the composite display controller 116 (which itself may receive information from the scheduling systems 102). As such, the composite display 120, and the content rendered on the composite display 120, can be controlled by the scheduling system 102 (e.g., specified by a news program schedule or another predetermined sequence). The composite display driver 118 receives input video streams 146*a-b* from the router 112 and outputs display driver signals on paths 154*a-d* for the individual display panels 122*a-d* in the composite display 120. Video can be sub-divided across the panels 122*a-d*, such that the panels 122*a-d* jointly render an intended output video stream. The composite display driver 118 can be configured to operate a given one of the display panels 122*a-d* to display a respective portion (e.g. a sub-frame) of an output video stream such that the individual panels 122*a-d* in the composite display 120 are operated in coordination to jointly render the output video stream.

In some cases, the composite display driver 118 may first generate an output video stream based in part on the input video stream(s) (e.g., the video streams provided via paths 146*a-b*). Once generated, the output video stream can be subdivided into portions for each of the display panels 122*a-d*, and re-sampled and/or converted as necessary to reduce distortion, etc. when rendered on the composite display 120. The composite display driver 118 may also be configured to sub-divide and/or re-sample in a manner that accounts for separations between adjacent ones of the individual panels 122*a-d* (e.g., due to bezels separating the display panels 122*a-d*).

In addition to providing the output video stream to the individual display panels 122*a-d*, the composite display driver 118 can be configured to run one or more DVEs using the incoming video stream(s). In some cases, the driver 118 may run a DVE by executing program instructions so as to generate an output video stream that is based, at least in part, on the incoming video stream(s). In practice, the execution of the program instructions can be executed so as to include modified versions of the incoming video stream(s) in the output video stream. For example, the composite display driver 118 may be configured to create the output video stream by applying scaling, positioning, perspective, shading, color-correction, and/or other effects to one or more input video streams. In one example, the output video stream for the composite display 120 may include multiple scaled framed windows overlaid on a background populated by scrolling text. Each window of video content can have a scaling, position, perspective, and/or color effect on the composite display 120.

Moreover, in some cases, the composite display 120 may be implemented using a single display panel, in which case the composite display driver 118 can apply DVE(s) and generate an output video stream for the single display panel without sub-dividing and/or re-sampling for rendering on multiple display panels. Such a single display panel may, in some cases, be a display panel with a native resolution different from the resolution of incoming video streams. For example, the display panel may have a resolution defined by an array of pixels with 2160 rows (e.g., an Ultra High Definition display panel with 3840 by 2160 pixels), and the incoming video streams may have a resolution defined by 1080 rows (1920 by 1080 pixels). In such an implementation, the display driver 118 may apply DVE(s) and resample and/or rescale the incoming video streams as necessary so as to generate an output video stream that corresponds to the native resolution of the single display panel.

Furthermore, in some cases the composite display driver 118 may be configured to run a predetermined set of DVEs, and each of the DVEs can be associated with a particular DVE identifier. For example, a given DVE identifier can be associated with a particular number of input video stream(s), provided on particular inputs to the composite display driver 118, and manipulated in accordance with a particular algorithm so as to generate output video streams to the display panels 122a-d. Upon the composite display controller 116 providing a given DVE identifier to the composite display driver 118 (e.g., by signaling via path 152), the composite display driver 118 may then recall the DVE associated with the given DVE identifier. Recalling the DVE may involve, for example, loading particular program instructions for the DVE and otherwise preparing to execute algorithms for the DVE. Then, the composite display driver 118 may receive a subsequent instruction to run the DVE (i.e., execute the algorithm and begin providing outputs to the composite display 120).

E. Composite Display Controller

To facilitate the operation of the composite display 120, the composite display controller 116 may communicate with the composite display driver 118 (via path 152), the media-server controller 104 (via path 156), and the scheduling system 102 (via path 150). In practice, during production of a news program the composite display controller 116 can receive data indicative of an upcoming event in which the composite display 120 is employed as an on-set visual aid. The received data may be provided by the media-server controller 104 (via path 156) after the media-server controller 104 evaluates a given news program schedule entry and identifies actions/events to be performed using the composite display 120. In some cases, the received data may be provided by the scheduling system 102 (via path 150) to evaluate such news program schedule entries. The received data may specify, for example, a DVE to be run by the composite display driver 118 using one or more input video streams. The composite display controller 116 can then inform the composite display driver 118 of the DVE to be run, for example by sending the composite display driver 118 a DVE indicator associated with the specified DVE.

At or about the same time, the composite display controller 116 and/or the media-server controller 104 can also send a request to the video feed network to route the input video streams to the composite display driver 118. The media-server controller 104 may reserve one or more of the media servers 108a-c for use in providing the input video streams to the composite display driver 118 if the input video streams correspond to stored video content items. For example, the composite display controller 116 and/or media-server controller 104 may evaluate the DVE and determine a quantity of input video streams needed to run the DVE, and then reserve the determined quantity of media servers so that those media servers are not allocated for other uses in the NPS 100. The media-server controller 104 may also instruct the router 112 to map the input channels on which the various input video streams are provided to the router 112 to particular output channels coupled to the composite display driver 118. In practice, the composite display driver 118 may be preconfigured to expect input video streams to be provided on particular ones of its inputs for each of the preconfigured DVEs the composite display driver 118 is configured to run. The media-server controller 104 may then determine, based on a given DVE to be run, which of the router output channels the video streams should be provided on to accommodate the configuration of the composite display driver 118, and instruct the router 112 accordingly.

In one example, to coordinate operation of the composite display 120, the composite display controller 116 first receives an indication of an upcoming DVE to be run (e.g., based on an entry in a news program schedule), then sends a corresponding DVE indicator to the composite display driver 118 to thereby cause the composite display driver 118 to recall that DVE and otherwise prepare to run the DVE. The media-server controller 104 can then communicate with the router 112 and/or media servers 108a-c to arrange for an input video stream to be provided and routed to the composite display driver 118 at inputs that the composite display driver 118 is configured to expect. In some cases, the media-server controller 104 may initially cause the various video sources to queue the specified video content, and then wait for a readiness indicator from the video source, before instructing the video source to begin providing the video stream.

To render the desired content on the composite display 120, the media-server controller 104 and/or composite display controller 116 may facilitate coordinated operation of the composite display driver 118 and video feed network by sending timing signals to both at or about the same time. Such timing signals may cause the composite display driver 118 to begin running the DVE just as the video feed network begins providing the input video stream to the composite display driver 118, for example. In some examples, the timing signal may be initiated in response to receiving a user input from a user input device, perhaps after a user interface associated with the user input device provides a notification of the readiness indicator from the various video sources in the video feed network.

F. Camera

The camera 124 can be situated to capture a field of view that includes at least a portion of the composite display 120. For example, the composite display 120 can be situated on a news set, and the camera 124 can be positioned to capture a portion of the news set that includes the composite display 120. As such, video content captured by the camera 124 can include any video content displayed via the composite display 120. While video content is being displayed on the composite display 120, the scheduling system 102 can cause video content captured using the camera 124 to be mapped to an output of the production switcher 114.

Moreover, a news anchor (or other individual) may also be within the field of view of the camera 124 (e.g., by standing in front of the composite display 120). So positioned, the news anchor may use the composite display 120 as a visual aid to enhance the discussion of news stories. For instance, graphs, videos, quotes, etc., may be displayed on the composite display 120 while a news anchor discusses news stories and gestures toward content on the composite display 120 to emphasize or deemphasize points as desired. Furthermore, news anchors can provide context for information on the composite display 120 by including commentary and analysis and by their reactions (e.g., facial reactions, gestures, postures).

G. Production Switcher

The production switcher 114 receives video input streams and uses the video input stream to generate a video output stream from the NPS 100, on path 160. The scheduling system 102 (or another component operating based on events specified in the news program schedule) can provide instructions to the production switcher 114 via path 142 to indicate which video stream (or multiple video streams) to use to generate the output video stream on path 160. The production switcher 114 can receive video inputs from the router 112 (i.e., from streaming sources and/or media servers) via paths 144a-b and also from the camera 124 (e.g., via path 143). The output video stream on path 160 may be subjected to further processing and may be passed to a broadcasting system or other distribution system.

In operation then, the scheduling system 102 may be configured to provide information (e.g., a news program schedule) to various components in the NPS 100 to cause the NPS 100 to operate such that specified stored or streamed video content item is rendered on the composite display panel 120. At or about the same time, the information can cause the production switcher 114 to use video from the camera 124, which captures at least a portion of the composite display 120 to generate the output video stream. The composite display 120 can thereby be operated in a substantially automated fashion to render specified video content using the same scheduling system 102 that regulates the other components of the NPS 100. As such, the composite display 120 can be readily integrated in to the NPS 100 to render content in accordance with a predetermined news program schedule.

H. Example NPS Device

Figure 2:
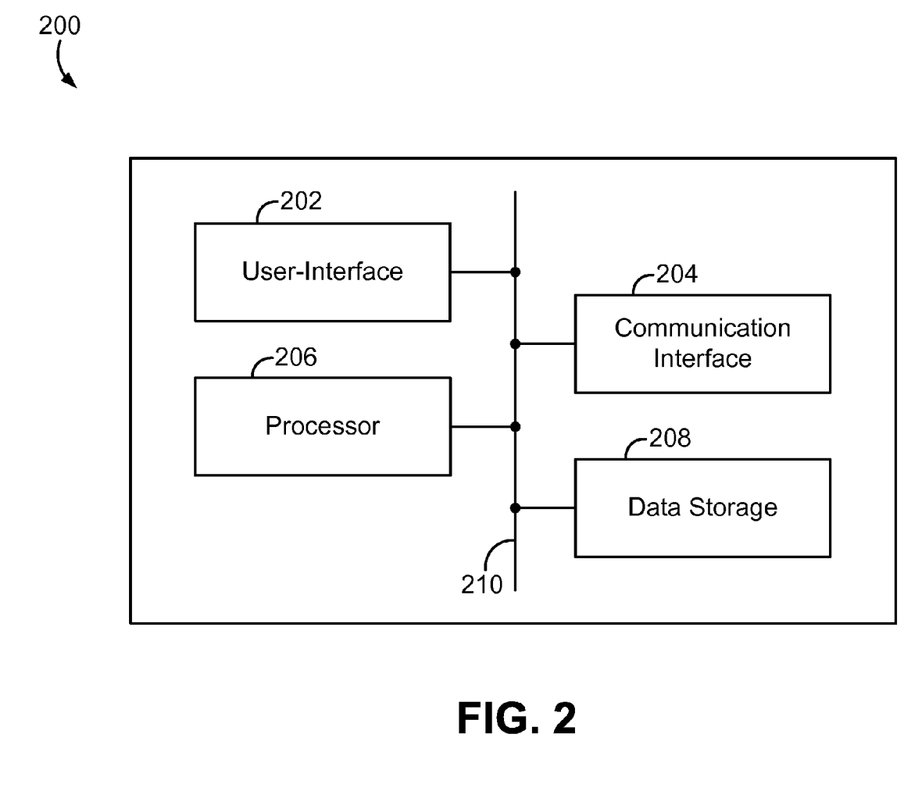
FIG. 2 is a simplified diagram of an example device of the NPS of FIG. 1.

FIG. 2 is a simplified block diagram of a device 200. The device 200 may take a variety of forms, including for example the scheduling system 102, the media-server controller 104, the data storage 106, one of the media servers 108a-c, the streaming source 110, the router 112, the production switcher 114, the composite display controller 116, and/or the composite display driver 118.

The device 200 may include various components, including for example, a user-interface 202, a communication interface 204, a processor 206, and a data storage 208, all of which may be electronically connected to each other via a system bus or other connection mechanism 210. Note that the device 200 need not include all of these components and it may include additional components.

The user-interface 202 may function to allow the device 200 to interact with a user, such as to receive input from a user and to provide output to the user. Thus, the user-interface 202 may include input components such as a computer mouse, a keyboard, or a touch-sensitive panel. The user-interface 202 may also include output components such as a display screen (which, for example, may be combined with a touch-sensitive panel) or a speaker. In some cases, the user-interface 202 may be used by a producer or other newsroom personnel to provide inputs for control of timing or synchronization of certain events performed in accordance with news program schedule entries.

For instance, a producer (or director, etc.) may monitor events on a news set, such as the readiness of other personnel for certain events to be performed and/or status indicators of various NPS sub-systems (which status indicators may be communicated using output components of the user-interface 202). Once the producer judges that the conditions are ready for performance of a next event (or sequence of events) specified by one or more news program schedule entries, the producer can provide an input using the user-interface 202 (e.g., by pressing a button). Upon receipt of data indicating the user input, the NPS can then perform the particular event(s). Such user inputs are therefore referred to herein as timing signals or initiation signals. Moreover, in some cases events may be carried out following a predetermined delay after receipt of an initiation signal.

The communication interface 204 may function to allow the device 200 to communicate with other devices (e.g., over the paths described above). The communication interface 204 may be configured to transmit and/or receive various types of data, including for example control data or video stream data. In one example, the communication interface 204 may take the form of a wired interface, such as an Ethernet port, USB port, or HD-SDI port. As another example, the communication interface 204 may take the form of a wireless interface, such as a WiFi interface. In either case, the communication interface 204 may include communication input and/or communication output interfaces.

The processor 206 may include one or more general purpose processors (e.g., microprocessors) and/or one or more special purpose processors (e.g., digital signal processors (DSPs)).

The data storage 208 may include one or more volatile and/or non-volatile storage components, such as magnetic, optical, flash, or organic storage, and may be integrated in whole or in part with the processor 206. The data storage 208 may include removable and/or non-removable components. In some examples, the data storage 208 may include multiple storage drives that store data in a redundant and/or stripped configuration.

Generally, the processor 206 may be configured to execute program instructions (e.g., compiled or non-compiled program logic and/or machine code) stored in the data storage 208 to perform one or more of the functions described herein and/or shown in the accompanying drawings. As such, the data storage 208 may take the form of a non-transitory computer-readable storage medium, having stored thereon program instructions that, upon execution by the processor 206, cause the device 200 to perform one or more of the functions described herein and/or shown in the accompanying drawings.

III. Example News Set with Composite Display

Figure 3:
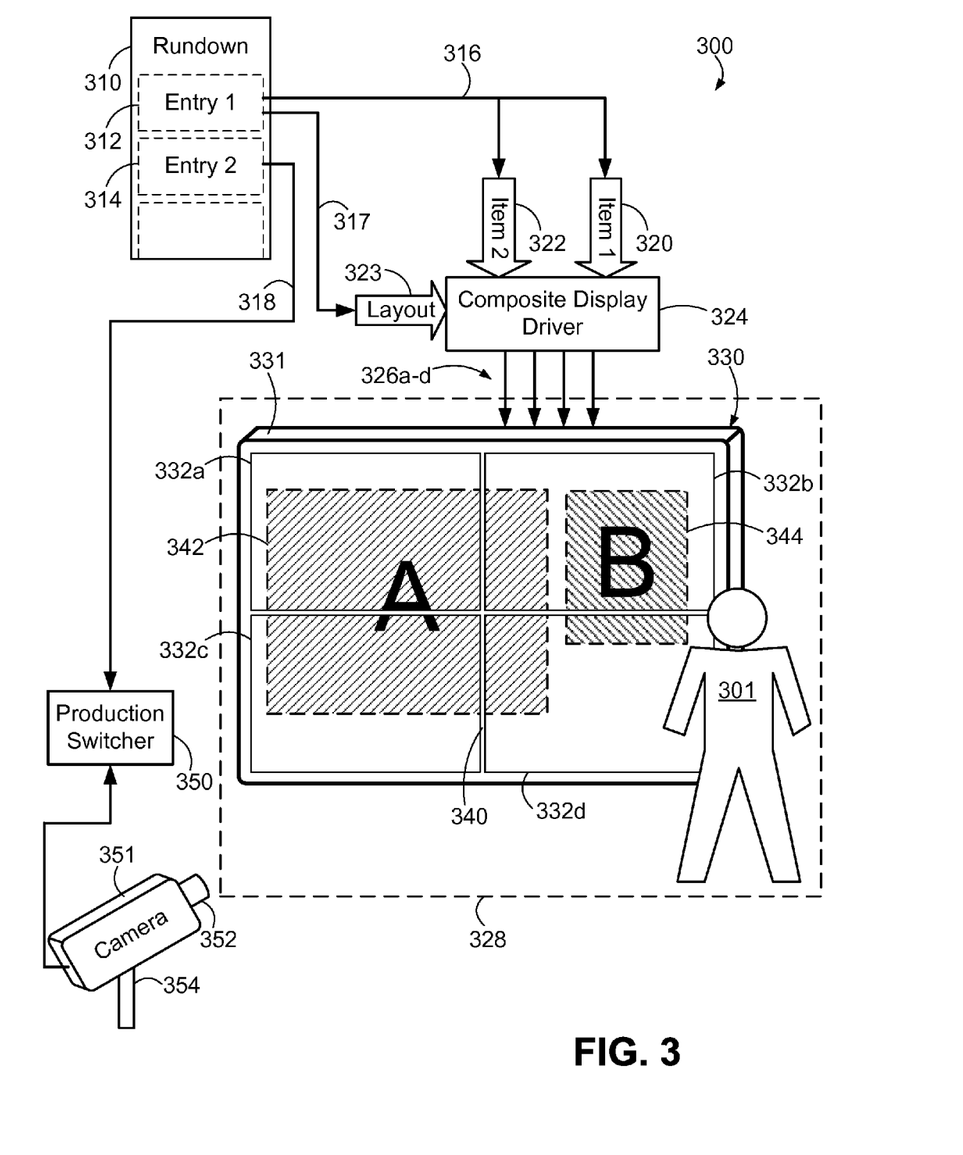
FIG. 3 symbolically illustrates an example process flow in which a composite display is utilized as a visual aid on a news set.

FIG. 3 illustrates an example NPS 300 in which a composite display is utilized as a visual aid on a news set. The NPS 300 can be the same as or similar to the NPS 100 described above in connection with FIG. 1, although some systems and devices are omitted from the illustration in FIG. 3 to emphasize signaling and information flow within the system 300 during an example operation.

The NPS 300 includes a production switcher 372 in connection with a camera 371 and a composite display 360 that is driven by a composite display driver 318 based on inputs from a composite display controller 314, which may indicate a DVE indicator 336, and on inputs from a video feed network 320, which may route video content items to the composite display driver 318 based on instructions from a media-server controller 312. The composite display 360, composite display driver 318, composite display controller 314, media-server controller 312, and production switcher 372 may be the same as or similar to the composite display 120, composite display driver 118, composite display controller 116, media-server controller 104, and production switcher 114, respectively, described above in connection with FIG. 1.

An example news program schedule 302 includes multiple entries 304, 306. The news program schedule 302 is used by a scheduling system (not shown), which may be the same as or similar to the scheduling system 102 described in connection with FIG. 1, to provide information to various components and sub-systems in the NPS 300 to thereby cause functions to be performed. The news program schedule 302 can include ordered entries, each represented as a separate row or otherwise delineated. Each entry includes one or more attributes, such as timing information (e.g., to indicate a start time of a particular action), video source information (e.g., a title, a content item identifier, a media-server identifier), router instructions (e.g., to map router inputs to router outputs so as to distribute video streams throughout the NPS 300), composite display information (e.g., indications of DVEs to run using one or more input video streams to generate an output video stream that is rendered on the composite display), and production switcher information. In one example, a user may create the news program schedule 302 via a user interface of a scheduling/sequencing system (e.g., the same as or similar to the scheduling system 102 described in connection with FIG. 1).

During operation, the entries in the news program schedule 302 can be accessed by a scheduling system and suitable information can then be provided to components in the NPS 300 to cause them to perform actions corresponding to each entry. For example, the first entry 304 can include attributes specifying a source of video to be played on the composite display 360 and a DVE to be run using the composite display driver 318. The second entry 306 can include attributes to cause video captured by the camera 371 to be used by a production switcher 372 in generating an output video stream from the NPS 300.

The media-server controller 312, the composite display controller 314, or a combination thereof, form a control component 310, which operates to regulate/control the operation of the composite display 360. The media-server controller 312 and the composite display controller 314 may communicate amongst one another as necessary using signals over path 332 to coordinate actions of each so as to cause the control component 310 to function as described herein. Upon receiving information based on the first entry 304, the control component 310 can identify attributes indicated by the first entry 304. The control component 310 can then generate signals to components in the NPS 300 to cause corresponding actions to be performed.

In practice then, the control component 310 functions to receive information from the entry 304 (e.g., via the signals on path 330), and, based on attributes included in the received information, identify a DVE to be run by the composite display driver 318 using video content item(s) specified by the entry 304. The control component 310 can then send an indication to the composite display driver 318 to inform the composite display driver 318 of the identified DVE, which causes the composite display driver 318 to recall the identified DVE. For example, the composite display controller 314 can send a DVE indicator 336 to the composite display driver 318 via path 334.

The control component 310 can also cause the video feed network 320 to route the specified input video stream(s) to the composite display controller 318. For example, the video feed network 320 may include video source(s) 322 (e.g., media servers and/or streaming video sources) and a router 324. To cause the video feed network 320 to route the specified video sources, the media-server controller 312 may send instructions to the video source(s) 322 over path 338 and to the router 324 over path 340. As a result of the instructions, the video source(s) may first queue the specified video content (e.g., load and buffer a video content item corresponding to the video content) and then output the video stream, and direct the video stream to the composite display driver 318 using the router 324. In the example depicted in FIG. 3, the identified DVE can specify two video streams corresponding to two stored video content items (e.g., a first video content item 346 and a second content item 348). Upon instructions from the control component 310, the router 324 can then provide the two video streams 346, 348 to the driver over paths 342, 344.

In addition, the control component 310 may be associated with a user interface 316. The user interface 316 may include one or more user input devices (e.g., buttons, dials, touch-sensitive panels, voice-sensitive inputs) for receiving inputs from a user and one or more user output devices (e.g., displays, haptic feedback systems, audio output systems) for conveying outputs to a user. In operation, the user interface 316 may receive a status indicator 352 from the control component 310 over path 350. The status indicator 352 may be, for example, a readiness indicator indicating that the video feedback network 320 is queued to provide the specified video content. The status indicator 352 may additionally or alternatively include information indicating the status of other components in the NPS 300. Upon receiving the status indicator 352, the user interface 316 can provide a notification of the status indicator 352 to thereby inform the user of the information indicated thereby (such as a producer monitoring the functioning of the NPS 300). The user interface 316 can also receive an input, via its user input device. The input may, for example, generate a timing indicator 356 that is sent to the control component 310 via path 354. The timing indicator 356 may, for example, indicate a start time to begin routing video stream(s) to the composite display driver 318 and begin running the DVE.

The composite display 360 that is controlled by the control component 310 includes a frame or housing 364 to which individual display panels 362a-d are mounted adjacent to one another so as to form a combined display area. As shown in FIG. 3, the composite display 360 can have a rectangular display area sub-divided into quadrants and each quadrant can include a separate display panel. For example, the display panel 362a can be mounted in an upper left quadrant; display panel 362c can be mounted in a lower left quadrant; display panel 362b can be mounted in an upper right quadrant; display panel 362d can be mounted in a lower right quadrant. The edges between adjacent display panels (e.g., the display panels 362c and 362d) may be separated by a bezel 366. Each of the individual display panels 362a-d can then receive a respective separate driving signal 358a-d (e.g., a video stream corresponding to the respective quadrant for each display panel) from the composite display driver 318.

The production switcher 372 receives an input video stream from the camera 371 (among other inputs) and generates an output video stream, which may be sent to a broadcast system, for example. The camera 371 can be positioned to capture video of a field of view 378 that includes the composite display 360. The camera 371 can be mounted on an adjustable arm 376 that allows for adjusting the orientation and/or position of the camera 371. The camera 371 can also include a primary lens assembly 374 configured to focus incoming light from the field of view 378 onto a plane including a digital image sensor within the camera 371. The digital image sensor (e.g., CCD array, CMOS array) can then output data indicative of the light received during a series of frames to create a stream of the captured video (e.g., a stream of digital values indicative of the light received by the camera 371).

As represented in FIG. 3, the first entry 304 can include attributes specifying an event in which a DVE is run using two video content items formatted with a particular layout, and the resulting output video is rendered on the composite display 360. Upon receiving information based on the first entry 304, the control component 310 can generate and send the DVE indicator 336 to the composite display driver 318, which causes the composite display driver 318 to recall the identified DVE. The control component 310 can also generate and send video streams to the composite display driver 318 that are based on the two video content items: the first video content item 346 and the second video content item 348. For example, the control component 310 may request for the video feed network 320 to reserve two media servers, and the reserved media servers may then retrieve, decode, and play out the specified video content items 346, 348. The video streams based on the two video content items 346, 348 can then be routed to particular inputs of the composite display driver 318 that are associated with the identified DVE. For instance, the control component 310 may have a lookup table or the like that associates each DVE that the composite display driver 310 is preconfigured to run with particular inputs to the composite display driver 318 on which the composite display driver 318 expects to receive input video streams when running such DVEs. Running the DVE may involve, for example, arranging the incoming video streams in accordance with a particular layout. The layout may provide, for instance, a particular position, color effect, size, scaling, perspective, shading, etc. with which to arrange the input video streams when rendered on the composite display 360.

The DVE indicator 336 provided to the composite display driver 318 may cause the composite display driver 318 to arrange the video streams of the two content items 346, 348 on the composite display 360 in accordance with a particular preconfigured format. For example, the first entry 304 can specify a size or scaling factor of the content items and/or a position on the composite display 360. Upon recognizing the DVE indicator 336, the composite display driver 318 can recall particular program instructions and/or algorithms for causing the associated video effects. The layout specified with the DVE indicator 336 may specify that the stream from the first video content items 346 is rendered at a first absolute or relative position on the display area of the composite display 360 while the stream from the second video content items 348 is rendered at a second absolute or relative position on the display area. With the DVE recalled, the composite display driver 318 is configured to receive the video streams corresponding to the video content items 346, 348 and generate output video streams to the composite display 360 (e.g., by providing the driver signals over paths 358a-d to the respective display panels 362a-d) so as to cause the video streams corresponding to the video content items 346, 348 to be rendered according the layout for the identified DVE.

Additionally or alternatively, the DVE indicator 336 may specify a "trapezoidal scaling" to apply a perspective to the rendered video streams. For example, rather than rendering the video content items within a rectangle having equal widths along top and bottom edges and equal heights along left and right edges, the trapezoidal squeeze may scale a video into a shape with unequal top and bottom edges and/or unequal left and right edges. Such a trapezoidal effect may cause the video content items to be rendered from a perspective view. Moreover, video content items may be rendered with some degree of cropping, such as by rendering a rectangular source video within a region shaped as a square (e.g., by cropping away side edges of the source video), circle, oval, ellipse, polygon, or any other closed shape.

Further still, as noted above, the DVE indicator 336 may indicate one of a group of preconfigured DVEs. For instance, the composite display driver 318 may be preconfigured to recognize (and perform suitable DVEs to carry out) a group of DVEs so as to provide commonly employed layout templates. Each template may then be associated with a DVE indicator which corresponds to a particular scaling, positioning, perspective, and so on of a particular number of input video streams provided via particular inputs to the composite display controller 318.

An example layout is shown in FIG. 3 in which the first video content items 346 is represented by a first hashed region 368 including the letter "A" and the second video content item 348 is represented by a second hashed region 369 including the letter "B." The position and size (e.g., scaling) of each content item, among other factors, can be specified by the DVE indicator 336 based on a saved configuration of the composite display driver 318. The composite display driver 318 can be configured to apply DVEs sufficient to cause the content items to be rendered in the specified layout. As shown in FIG. 3, the first content item (indicated by the letter "A") may be rendered in the region 368 that spans multiple ones of the individual display panels 362a-d.

Further still, a static or dynamic background may be included and static or dynamic text, logos, other visual content, etc., may be included on the background and/or superimposed over the regions 368, 369. The resulting output video streams incorporating the video content item(s) in accordance with the layout and/or template specified by the DVE indicator 336 is then suitable for rendering using the composite display 360. In some examples, the control component 310 may provide timing information, perhaps based in part on the user interface 316, to specify that the video streams corresponding to the video content items 346, 348 be routed to the composite display driver 318 during a period that is contemporaneous (e.g., overlaps in time) with the period in which the composite display driver 318 runs the DVE(s) specified by the DVE indicator 336.

Upon accessing the second entry 306, the scheduling system or another component of the NPS 300 can identify attributes indicated by the second entry 306. Based on the attributes identified, the component(s) of the NPS 300 can then send signals to cause actions to be performed in accordance with the second entry 306. For example, signals may be sent to the production switcher 372 (via path 370) so as to cause the production switcher 372 to receive video captured by the camera 371, and to use the captured video to generate an output video stream from the NPS 300. In particular, the second entry 306 may specify that the production switcher 372 use camera-captured video of the field of view 378 while the composite display 360 renders the video content specified by the first entry 304. The field of view 378 can include both the composite display 360 and a news anchor 301 (or other individual) who uses the composite display 360 as a visual aid in presenting news topics. For example, the news anchor 301 may discuss news stories while gesturing toward videos, graphs, quotes, photos, other visual aids, etc., that are rendered on the composite display 330. In some examples, the composite display 360 may display video from a field correspondent, who may then converse (or otherwise interact) with the news anchor 301.

In some cases, the first and second entries 304, 306 include timing information to cause the performance of the corresponding actions (rendering specified video content on the composite display 360 and providing an output video stream based on capturing video of a scene including the composite display 360) to be carried out contemporaneously. In some cases, the initiation of one or both of the actions indicated by the entries 304, 306 may be at least partially based on an external input, such as an input received via the user interface 316 associated with the control component 310. Upon initiation, the timing information may specify an ordering and/or pre-determined delay before starting a next action (e.g., timing information may specify that the action associated with the second entry 306 commences at the same time the action associated with the first entry is initiated). For example, the timing information may cause the composite display 360 to begin displaying specified video content substantially simultaneously with the production switcher 372 switching to generate an output stream based on camera-captured video of the composite display 360. In another example, the period in which specified video content is rendered on the composite display 360 can at least partially overlap with a period in which the output video stream is based on video captured by the camera 371.

It is also noted that the news program schedule 302 has been greatly simplified for the purposes of providing an illustrative example of the disclosed system in connection with FIG. 3. In practice, a news program schedule is likely, although not required, to include a variety of data and data types generated in a semi-automated manner using a user interface to populate various fields associated with each entry. For example, news program schedule entries may include additional attributes, including for example, an index or "page" number, an estimated duration, an actual duration, and/or an author, some or all of which may be used to generate instructions to components in the NPS 300 and some or all of which may be used for other purposes, such as diagnostics, archiving, etc. However, for the sake of simplicity, the news program schedule 302 is illustrated in simplified form.

IV. Example Operations

Figure 4:
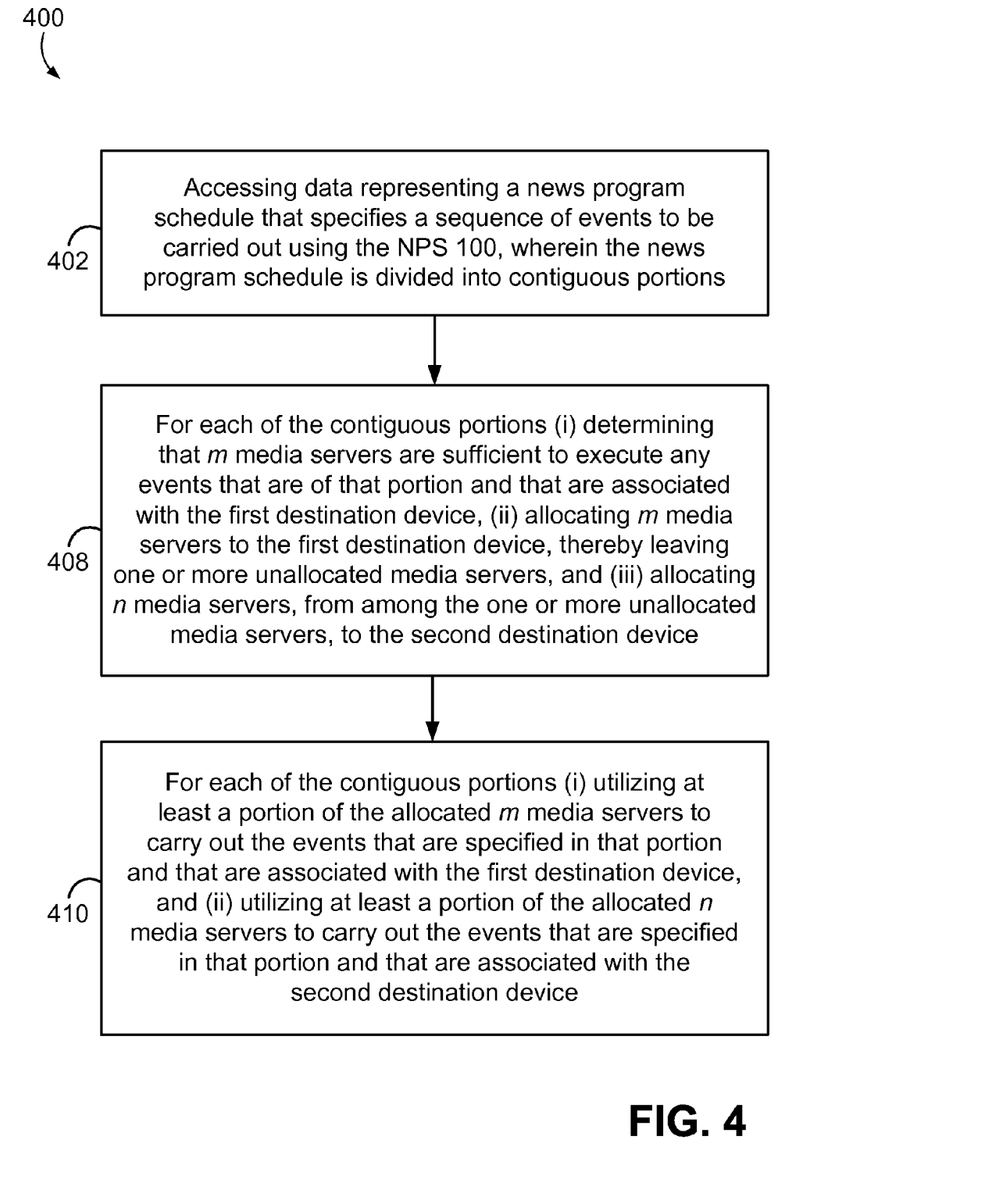
FIG. 4 is a flowchart of an example process that may be performed by an NPS.

FIG. 4 is a flowchart of an example process or method 400 that may be performed by the example NPSs described herein. For illustration purposes, the method will be described in connection with the NPS 100 of FIG. 1.

At block 402, the process 400 may involve accessing data representing a news program schedule that specifies a sequence of events to be carried out using the NPS 100, wherein the news program schedule is divided into contiguous portions. In one example, the news program schedule is divided by commercial-break markers into contiguous show-block portions. However, the schedule may be divided in other ways and/or into other portions.

At block 402, the process 400 may involve, for each of the contiguous portions (i) determining that m media servers are sufficient to execute any events that are of that portion and that are associated with the first destination device, (ii) allocating m media servers to the first destination device, thereby leaving one or more unallocated media servers, and (iii) allocating n media servers, from among the one or more unallocated media servers, to the second destination device.

To illustrate the function at block 402, assume that the NPS determines that one media server is sufficient to execute any events that are of that portion and that are associated with the composite display controller 118. Therefore, the function at block 402 may involve allocating one server (e.g., media server 108a) to the composite display controller 118 and allocating one or more servers (e.g., media servers 108b and/or 108c) from the unallocated media servers 108b-c, to the production switcher 160.

It should be understood that the process 400 is not limited to use with an NPS having 3 media servers, but could instead be used with an NPS having any number of media servers. Also, while the production switcher 114 and the composite display driver 118 of NPS 100 are discussed as example destination devices in the process 400, other types of destinations devices are also possible.

At block 402, the process 400 may involve, for each of the contiguous portions (i) utilizing at least a portion of the allocated m media servers to carry out the events that are specified in that portion and that are associated with the first destination device, and (ii) utilizing at least a portion of the allocated n media servers to carry out the events that are specified in that portion and that are associated with the second destination device.

Continuing with the example provided above, the function at block 402 may involve (i) utilizing at least a portion of the allocated media server 108a to carry out the events that are specified in that portion and that are associated with the composite controller driver 118, and (ii) utilizing at least a portion of the allocated media servers 108b-c to carry out the events that are specified in that portion and that are associated with the production switcher 114.

Each of the functions of (i) utilizing at least a portion of the allocated media server 108a to carry out the events that are specified in that portion and that are associated with the composite controller driver 118 and (ii) utilizing at least a portion of the allocated media servers 108b-c to carry out the events that are specified in that portion and that are associated with the production switcher 114, may involve one or more of the functions described above in connection with FIGS. 1 and 3.

The functions of allocating and utilizing media servers described above may then be repeated various times throughout the news program (e.g., in connection with each contiguous portion of the news program) such that the media servers 108a-c of the NPS can be re-allocated and re-utilized as needed.

In the case where the NPS lacks a sufficient number of media servers to execute events that are of a particular portion of the schedule and that are associated with a particular destination device, the NPS may provide via a user interface an alert indicating the same. This may allow a user to modify the news program schedule to remedy the issue (e.g., by simplifying a particular DVE scheduled to be executed on the production switcher or the composite display driver).

V. Example Variations

While one or more functions have been described as being performed by certain devices or entities (e.g., the scheduling system 102), the functions may be performed by any device or entity, such as those included in the NPS 100 or the NPS 300 described above.

In some embodiments, a given news program schedule entry may specify a single action to be performed by the NPS. In other embodiments, a given entry may specify multiple actions to be performed and such actions may be performed sequentially, simultaneously, or in another manner as specified by the entry. Thus, some embodiments may include using a single entry to facilitate both rendering of content on the video display and using captured video from the camera to generate a video output stream from the production switcher, rather than using separate entries for each as described in connection with FIG. 3. Moreover, some embodiments may include using multiple entries to facilitate performance of action(s) described as associated with a single entry herein.

In some embodiments, the NPS may include a single display panel instead of a composite display, or perhaps in addition to a composite display, used as a visual aid on a news set. In such embodiments, the NPS can function in accordance with entries in a news program schedule to provide specified input video stream(s) to a display driver, and then the display driver can run specified DVEs using the input video stream (s), and generate an output video stream to be rendered on the single display panel. Thus, the functions described in connection with the description of a composite display and a composite display driver may be extended to functions performed of a single display panel operated by suitable display driver. In particular, many functions described herein as being performed by a composite display driver (e.g., running DVEs in accordance with an entry in a news program schedule) may instead be performed by a display driver suitable for generating video to be rendered on a single display panel. And similarly, many functions described herein as being performed by a composite display (e.g., rendering an output video stream provided by the display driver) may instead be performed by a single display panel.

Further, while examples of the disclosed method have been described in connection with an NPS, examples of the method may be implemented in other environments.

Also, the functions need not be performed in the disclosed order, although in some examples, an order may be preferred. And not all functions need to be performed to achieve the desired advantages of the disclosed system and method, and therefore not all functions are required.

It should also be noted that the variations described in connection with select examples of the disclosed system and method may be applied to all other examples of the disclosed system or method.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A method for use with a news production system (NPS) comprising multiple media servers, a router, a first destination device, and a second destination device, wherein an output of each of the media servers is connected to a respective input of the router, a first output of the router is connected to an input of the first destination device, and a second output of the router is connected to an input of the second destination device, the method comprising:
   accessing data representing a news program schedule that specifies a sequence of events to be carried out using the NPS, wherein the news program schedule is divided into contiguous portions;
   for each of the contiguous portions: (i) determining that m media servers are sufficient to execute any events that are of that portion and that are associated with the first destination device, (ii) allocating m media servers to the first destination device, thereby leaving one or more unallocated media servers, and (iii) allocating n media servers, from among the one or more unallocated media servers, to the second destination device; and
   for each of the contiguous portions (i) utilizing at least a portion of the allocated m media servers to carry out the events that are specified in that portion and that are associated with the first destination device, and (ii) utilizing at least a portion of the allocated n media servers to carry out the events that are specified in that portion and that are associated with the second destination device.

2. The method of claim 1, wherein the first destination device comprises a display driver.

3. The method of claim 2, wherein an event associated with the first destination device comprises an event where the first destination device executes a digital video effect (DVE).

4. The method of claim 1, wherein the second destination device comprises a production switcher.

5. The method of claim 4, wherein an event associated with the second destination device comprises an event where the second destination device executes a digital video effect (DVE).

6. The method of claim 1, wherein the news program schedule is divided by commercial-break markers into contiguous show-block portions.

7. The method of claim 1, wherein causing the NPS to utilize at least a portion of the allocated m media servers to carry out the events that are specified in that portion and that are associated with the first destination device comprises causing the NPS to utilize the allocated m media servers to carry out the events that are specified in that portion and are that associated with the first destination device.

8. The method of claim 1, wherein causing the NPS to utilize at least a portion of the allocated n media servers to carry out the events that are specified in that 11/portion and that are associated with the second destination device comprises causing the NPS to utilize the allocated n media servers to carry out the events that are specified in that portion and are that associated with the second destination device.

9. A non-transitory computer-readable medium having stored thereon program instructions that when executed by a processor cause performance of a set of functions, the set of functions in connection with a news production system (NPS) comprising multiple media servers, a router, a first destination device, and a second destination device, wherein an output of each of the media servers is connected to a respective input of the router, a first output of the router is connected to an input of the first destination device, and a second output of the router is connected to an input of the second destination device, the set of functions comprising:
   accessing data representing a news program schedule that specifies a sequence of events to be carried out using the NPS, wherein the news program schedule is divided into contiguous portions;
   for each of the contiguous portions: (i) determining that m media servers are sufficient to execute any events that are of that portion and that are associated with the first destination device, (ii) allocating m media servers to the first destination device, thereby leaving one or more unallocated media servers, and (iii) allocating n media servers, from among the one or more unallocated media servers, to the second destination device; and
   for each of the contiguous portions (i) utilizing at least a portion of the allocated m media servers to carry out the events that are specified in that portion and that are associated with the first destination device, and (ii) utilizing at least a portion of the allocated n media servers to carry out the events that are specified in that portion and that are associated with the second destination device.

10. The non-transitory computer-readable medium of claim 9, wherein the first destination device comprises a display driver.

11. The non-transitory computer-readable medium of claim 10, wherein an event associated with the first destination device comprises an event where the first destination device executes a digital video effect (DVE).

12. The non-transitory computer-readable medium of claim 9, wherein the second destination device comprises a production switcher.

13. The non-transitory computer-readable medium of claim 12, wherein an event associated with the second destination device comprises an event where the second destination device executes a digital video effect (DVE).

14. The non-transitory computer-readable medium of claim 9, wherein the news program schedule is divided by commercial-break markers into contiguous show-block portions.

15. The non-transitory computer-readable medium of claim 9, wherein causing the NPS to utilize at least a portion of the allocated m media servers to carry out the events that are specified in that portion and are that associated with the first destination device comprises causing the NPS to utilize the allocated m media servers to carry out the events that are specified in that portion and are that associated with the first destination device.

16. The non-transitory computer-readable medium of claim 9, wherein causing the NPS to utilize at least a portion of the allocated n media servers to carry out the events that are specified in that portion and are that associated with the second destination device comprises causing the NPS to utilize the allocated n media servers to carry out the events that are specified in that portion and are that associated with the second destination device.

17. A news production system (NPS) comprising multiple media servers, a router, a first destination device, a second destination device, and a control system wherein an output of each of the media servers is connected to a respective input of the router, a first output of the router is connected to an input of the first destination device, and a second output of the router is connected to an input of the second destination device, wherein the control system is configured for:
  accessing data representing a news program schedule that specifies a sequence of events to be carried out using the NPS, wherein the news program schedule is divided into contiguous portions;
  for each of the contiguous portions: (i) determining that m media servers are sufficient to execute any events that are of that portion and that are associated with the first destination device, (ii) allocating m media servers to the first destination device, thereby leaving one or more unallocated media servers, and (iii) allocating n media servers, from among the one or more unallocated media servers, to the second destination device; and
  for each of the contiguous portions (i) utilizing at least a portion of the allocated m media servers to carry out the events that are specified in that portion and that are associated with the first destination device, and (ii) utilizing at least a portion of the allocated n media servers to carry out the events that are specified in that portion and that are associated with the second destination device.

18. The NPS of claim 17, wherein the first destination device comprises a display driver and the second destination device comprises a production switcher.

19. The NPS of claim 17, wherein an event associated with the first destination device comprises an event where the first destination device executes a digital video effect (DVE), and wherein an event associated with the second destination device comprises an event where the second destination device executes a DVE.

20. The NPS of claim 17, wherein the news program schedule is divided by commercial-break markers into contiguous show-block portions.

* * * * *